(12) United States Patent
Luo et al.

(10) Patent No.: US 10,389,471 B2
(45) Date of Patent: *Aug. 20, 2019

(54) WAVELENGTH INDICATION IN MULTIPLE-WAVELENGTH PASSIVE OPTICAL NETWORKS

(71) Applicant: Futurewei Technologies, Inc., Plano, TX (US)

(72) Inventors: Yuanqiu Luo, Cranbury, NJ (US); Frank J. Effenberger, Frisco, TX (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/025,981

(22) Filed: Jul. 2, 2018

(65) Prior Publication Data

US 2018/0331777 A1    Nov. 15, 2018

Related U.S. Application Data

(63) Continuation of application No. 15/591,314, filed on May 10, 2017, now Pat. No. 10,014,973, which is a
(Continued)

(51) Int. Cl.
*H04B 10/20* (2006.01)
*H04J 14/00* (2006.01)
(Continued)

(52) U.S. Cl.
CPC ........ *H04J 14/0246* (2013.01); *H04B 10/572* (2013.01); *H04J 14/0223* (2013.01);
(Continued)

(58) Field of Classification Search
None
See application file for complete search history.

(56) References Cited

U.S. PATENT DOCUMENTS 7,092,595 B2    8/2006   Sorin et al.
9,667,377 B2 *  5/2017   Luo ..................... H04J 14/0278
(Continued)

FOREIGN PATENT DOCUMENTS

CA    2763095 A1   12/2010
CN    1925370 A     3/2007
(Continued)

OTHER PUBLICATIONS

Lam, Cedric F, "Passive Optical Networks: Principle and Practice", Elsevier, 2007, pp. 311-313.
(Continued)

*Primary Examiner* — Kenneth N Vanderpuye
*Assistant Examiner* — Jai M Lee
(74) *Attorney, Agent, or Firm* — Gregg L. Jansen

(57) ABSTRACT

A method and apparatus for communications in a passive optical network (PON) system are provided. An optical line terminal (OLT) generates a PON downstream Physical Layer (PHY) frame comprising a downstream physical synchronization block (PSBd) that comprises a wavelength identification (ID) of at least one downstream wavelength of the plurality of downstream wavelengths. The OLT sends the PON PHY frame comprising the wavelength ID in the PSBd to ONU for confirming the at least one downstream wavelength.

20 Claims, 11 Drawing Sheets

Related U.S. Application Data continuation of application No. 13/440,765, filed on Apr. 5, 2012, now Pat. No. 9,667,377.

(60) Provisional application No. 61/473,439, filed on Apr. 8, 2011.

(51) Int. Cl.
*H04J 14/02* (2006.01)
*H04B 10/04* (2006.01)
*H04B 10/572* (2013.01)

(52) U.S. Cl.
CPC ...... *H04J 14/0241* (2013.01); *H04J 14/0258* (2013.01); *H04J 14/0267* (2013.01); *H04J 14/0278* (2013.01); *H04J 14/0282* (2013.01); *H04Q 2213/1301* (2013.01)

(56) References Cited

U.S. PATENT DOCUMENTS

| | | | |
|---|---|---|---|
| 10,014,973 B2* | 7/2018 | Luo | H04J 14/0278 |
| 2003/0099243 A1* | 5/2003 | Oh | H04Q 11/0066 |
| | | | 370/395.21 |
| 2004/0249976 A1 | 12/2004 | Neustadter et al. | |
| 2006/0165079 A1* | 7/2006 | Rodrigo | H04L 47/10 |
| | | | 370/389 |
| 2007/0092256 A1* | 4/2007 | Nozue | H04J 14/0282 |
| | | | 398/72 |
| 2008/0138072 A1* | 6/2008 | Sakamoto | H04J 14/0226 |
| | | | 398/68 |
| 2008/0166127 A1* | 7/2008 | Kazawa | H04J 14/0282 |
| | | | 398/79 |
| 2008/0267627 A1 | 10/2008 | Effenberger | |
| 2008/0304828 A1* | 12/2008 | Mizutani | H04B 1/707 |
| | | | 398/78 |
| 2009/0080889 A1 | 3/2009 | Nozue et al. | |
| 2009/0162053 A1 | 6/2009 | Ikeda et al. | |
| 2009/0263130 A1* | 10/2009 | Luo | H04Q 11/0067 |
| | | | 398/58 |
| 2010/0221007 A1 | 9/2010 | Sakamoto et al. | |
| 2011/0091213 A1 | 4/2011 | Kawaza et al. | |
| 2012/0093509 A1 | 4/2012 | Kazawa et al. | |
| 2012/0251108 A1 | 10/2012 | Chen et al. | |
| 2013/0004172 A1 | 1/2013 | Sugawa et al. | |
| 2015/0055955 A1* | 2/2015 | Kim | H04J 14/0239 |
| | | | 398/69 |
| 2015/0125149 A1* | 5/2015 | Gao | H04J 14/0246 |
| | | | 398/58 |

FOREIGN PATENT DOCUMENTS

| | | |
|---|---|---|
| CN | 101197637 A | 6/2008 |
| CN | 101222279 A | 7/2008 |
| CN | 101467366 A | 6/2009 |
| CN | 101621452 A | 1/2010 |
| CN | 101621723 A | 1/2010 |
| CN | 101742365 A | 6/2010 |
| JP | 2008172351 A | 7/2008 |
| JP | 2011139320 A | 7/2011 |
| JP | 2011147023 A | 7/2011 |
| RU | 2295506 C2 | 3/2007 |
| WO | WO-2009124476 A1 * 10/2009 ......... H04L 12/2861 |
| WO | 2010146658 A1 | 12/2010 |

OTHER PUBLICATIONS

Michael P. McGarry et al.,WDM Ethernet Passive Optical Networks,IEEE Optical Communications, dated Feb. 2006,total 8 pages.
Martinelli G et al: "GMPLS Signaling extensions for optical impairment aware lightpath setup; draft-martinelli-ccamp-optical-imp-signaling-01.txt", Feb. 22, 2008, XP015054301, 20 pages.
Otani: "Generalized Labels of Lambda-Switching Capable Label Switching Routers (LSR); draft-otani-ccamp-gmpls-lambda-labels-01.txt",Nov. 15, 2007, No. 1, XP015054446, 10 pages.
International Telecommunication Union, ITU-T G.989.3, Series G: Transmission Systems and Media,Digital Systems and Networks Digital sections and digital line system—Optical line systems for local and access networks, Phoneline networking transceivers—Isolation function, Mar. 2003. total 20 pages.
Kyeong-Eun Han:"An AWG-based WDM-PON architecture employing WDM/TDMA transmission for upstream traffic with dynamic bandwidth allocation",Photonic Network Communication 15(3)—Nov. 2, 2007. pp. 191-202.
International Telecommunication Union, ITU-T G.987.3: Series G: 10-Gigabit-Capable Passive Optical Networks (XG-PON): Transmission Convergence (TC) Layer Specification, Oct. 2010. total 134 pages.
Shiomoto NTT: "Use of Addresses in Generalized Multi-Protocol Label Switching (GMPLS) Networks; draft-ietf-ccamp-gmpls-addressing-05.txt",Oct. 22, 2006, vol. ccamp, na. 5, Oct. 22, 2006, XP015047744, 26 pages.
Jingjing Zhang et al. Design of WDM PON With Tunable Lasers: The Upstream Scenario, Journal of Lightwave Technology, vol. 28, No. 2, Jan. 15, 2010. pp. 228-236. XP011298610.
Michael P. McGarry et al. An Evolutionary WDM Upgrade for EPONs, Retrieved from the internet:http://mre.faculty.asu.edu/EPONupgrade.pdfJan. 1, 2005. XP055115813. total 24 pages.
Frank J Effenberger:"The XG-PON System: Cost Effective 10 Gb/s Access", Journal of Lightwave Technology, IEEE, USA, vol. 29, No. 4, Feb. 1, 2011, pp. 403-409, XP011345957.
Jun-Ichi Kani:"Enabling Technologies for Future Scalable and Flexible WDM-PON and WDM/TDM-PON Systems", IEEE Journal of Selected Topics in Quantum Electronics, IEEE Service Center, Piscataway, NJ, US, vol. 16, No. 5, Sep. 1, 2010, pp. 1290-1297, XP011298065.

* cited by examiner

| Octet | Upstream_Overhead Content |
|---|---|
| 1 | Broadcast ONU-ID |
| 2 | Message ID |
| 3 | Guard bit number |
| 4 | Type 1 preamble bit number |
| 5 | Type 2 preamble bit number |
| 6 | Type 3 preamble pattern |
| 7 | Delimiter byte 1 |
| 8 | Delimiter byte 2 |
| 9 | Delimiter byte 3 |
| 10 | Various indication |
| 11 | Pre-assigned delay |
| 12 | Pre-assigned delay |

600

| Octet | Profile Content |
|---|---|
| 1-2 | Broadcast or directed ONU-ID |
| 3 | Message ID |
| 4 | Sequence number |
| 5 | Profile version and index |
| 6 | FEC indication |
| 7 | Delimiter length |
| 8-15 | Delimiter pattern |
| 16 | Preamble length |
| 17 | Preamble repeat count |
| 18-25 | Preamble pattern |
| 26-33 | PON-TAG |
| 34-40 | Padding |
| 41-48 | Message integrity check |

| Octet | DS_Wavelength Content |
|---|---|
| 1-2 | Broadcast or directed ONU-ID |
| 3 | Message type ID |
| 4 | Sequence number |
| 5-a | Downstream wavelength |
| (a+1)-40 | Reserved or padding |
| 41-48 | Message integrity check |

| Octet | GATE Content |
|---|---|
| 1-6 | Destination address |
| 7-12 | Source address |
| 13-14 | Length/Type |
| 15-16 | Opcode |
| 17-20 | Timestamp |
| 21 | Number of grants/Flags |
| 22-60 | Grant and pad |
| 61-64 | Frame check sequence |

| Octet | DS WAVELENGTH Content |
|---|---|
| 1-6 | Destination address |
| 7-12 | Source address |
| 13-14 | Length/Type |
| 15-16 | Opcode |
| 17-20 | Timestamp |
| 21-b | Downstream wavelength |
| (b+1)-60 | Pad |
| 61-64 | Frame check sequence |

| Octet | US_Wavelength Content |
|---|---|
| 1-2 | Broadcast or directed ONU-ID |
| 3 | Message type ID |
| 4 | Sequence number |
| 5-a | Wavelength |
| (a+1)-40 | Reserved or padding |
| 41-48 | Message integrity check |

| Octet | REPORT Content |
|---|---|
| 1-6 | Destination address |
| 7-12 | Source address |
| 13-14 | Length/Type |
| 15-16 | Opcode |
| 17-20 | Timestamp |
| 21 | Number of queue sets |
| 22 | Report bitmap |
| 23-60 | Report and Pad |
| 61-64 | Frame check sequence |

| Octet | US WAVELENGTH Content |
|---|---|
| 1-6 | Destination address |
| 7-12 | Source address |
| 13-14 | Length/Type |
| 15-16 | Opcode |
| 17-20 | Timestamp |
| 21-b | Wavelength |
| (b+1)-60 | Pad |
| 61-64 | Frame check sequence |

FIG. 14

WAVELENGTH INDICATION IN MULTIPLE-WAVELENGTH PASSIVE OPTICAL NETWORKS

CROSS-REFERENCE TO RELATED APPLICATIONS

The application is a continuation of U.S. patent application Ser. No. 15/591,314, filed May 10, 2017 by Yuanqiu Luo, et al., which is a continuation of U.S. patent application Ser. No. 13/440,765 filed Apr. 5, 2012 by Yuanqiu Luo, et al and claiming the benefit of U.S. Provisional Patent Application No. 61/473,439 filed Apr. 8, 2011 by Yuanqiu Luo, et al., all of which are incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A passive optical network (PON) is one system for providing network access over "the last mile." The PON is a point to multi-point network comprised of an optical line terminal (OLT) at the central office, an optical distribution network (ODN), and a plurality of optical network units (ONUs) at the customer premises. In some PON systems, such as Gigabit PON (GPON) systems, downstream data is broadcasted at about 2.5 gigabits per second (Gbps) while upstream data is transmitted at about 1.25 Gbps. However, the bandwidth capability of the PON systems is expected to increase as the demands for services increase. To meet the increased demand in services, some emerging PON systems, such as Next Generation Access (NGA) systems, are being reconfigured to transport the data frames with improved reliability and efficiency at higher bandwidths, for example at about ten Gbps.

SUMMARY

In one embodiment, the disclosure includes an apparatus of a PON comprising an OLT component configured to couple to an ONU and send downstream wavelength identification to the ONU to indicate a wavelength that corresponds to the ONU, wherein the downstream wavelength identification is transmitted using a Media Access Control (MAC) layer frame for an embedded channel, a control message channel, or a data channel.

In another embodiment, the disclosure includes an apparatus of a PON comprising an ONU component configured to couple to an OLT and send upstream wavelength feedback to the OLT to indicate a wavelength that corresponds to the ONU, wherein the upstream wavelength feedback is transmitted using a MAC layer frame for an embedded channel, a control message channel, or a data channel.

In another embodiment, the disclosure includes a method implemented at an OLT for a PON comprising sending, using a transmitter, a downstream wavelength identification for an ONU that indicates a wavelength for the ONU in a MAC layer frame for an embedded channel, a control message channel, or a data channel.

In yet another embodiment, the disclosure includes a method implemented at an ONU for a PON comprising sending, using a transmitter, an upstream wavelength feedback for an OLT that indicates a wavelength for the ONU in a MAC layer frame for an embedded channel, a control message channel, or a data channel.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is a schematic diagram of another embodiment of a control message channel for downstream wavelength identification.

FIG. 7 is a schematic diagram of another embodiment of a control message channel for downstream wavelength identification.

FIG. 8 is a schematic diagram of another embodiment of a control message channel for downstream wavelength identification.

FIG. 9 is a schematic diagram of another embodiment of a control message channel for downstream wavelength identification.

FIG. 12 is a schematic diagram of an embodiment of a control message channel for upstream wavelength feedback.

FIG. 13 is a schematic diagram of another embodiment of a control message channel for upstream wavelength feedback.

FIG. 14 is a schematic diagram of another embodiment of a control message channel for upstream wavelength feedback.

DETAILED DESCRIPTION

Figure 1:
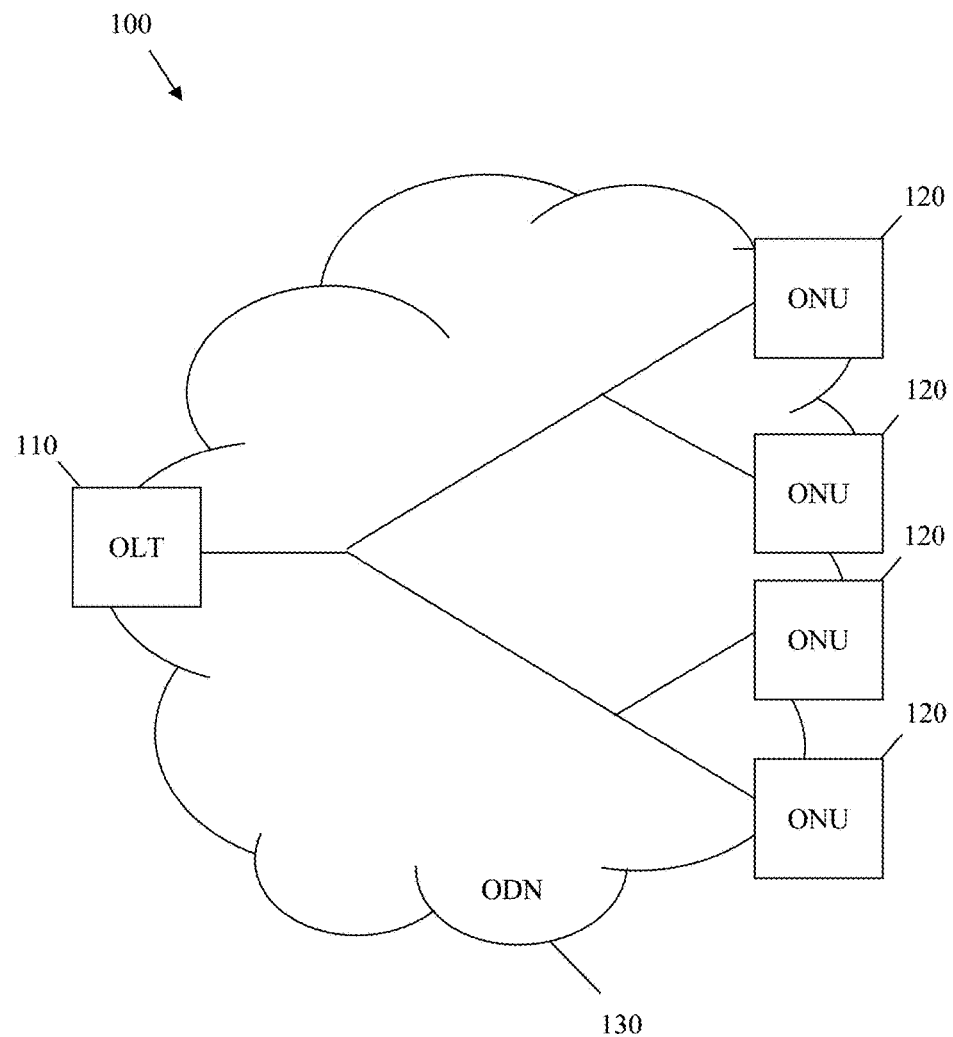
FIG. 1 is a schematic diagram of an embodiment of a PON.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A plurality of systems that support higher bit rates and more wavelengths (or wavelength channels) have been proposed for next generation PONs, such as a next generation PON (NGPON) architecture. For example, multiple-wavelength time division multiplexing (TDM) PON systems may stack multiple GPONs or 10 GPONs (XGPONs) (e.g., about 4 XGPONs) together using wavelength division multiplexing (WDM) technology to achieve rates higher than about 10 Gbps (e.g., about 40 Gbps). Other WDM-PON systems may connect different ONUs with different wavelengths in both downstream (from the PON's OLT) transmissions and upstream (towards the OLT) transmissions. Further, some PON systems may be based on advanced coding, modulation, and/or signal processing technologies, such as orthogonal frequency division multiplexing (OFDM)-PONs and coherent WDM (CWDM)-PONs. Other examples include dynamic spectrum management-PON (DSM-PON) systems, where the system capacity is increased by improving the OLT intelligence to subgroup legacy GPON or XGPON ONUs.

Depending on the employed technologies, the multiple-wavelength-TDM PONs may be classified as coarse WDM (CWDM)-TDM-PONs or dense WDM (DWDM)-TDM-PONs. Further, the WDM-PON may be splitter based or arrayed waveguide grating (AWG) based. The OFDM-PON may also be extended into an OFDM-TDM-PON, an OFDM-WDM-PON, or an OFDM-WDM-TDM-PON. The PONs' ONUs may be colorless, colored without wavelength tunability, colored with full tunability, or colored with partial tunability. The trends above of using different types of PONs and ONUs may provide further enhancement for GPON and XGPON bandwidth, e.g., to obtain a NGPON system that serves a larger number of ONUs/ONTs at longer distances.

The trends and enhancements above may be used for existing protocols of GPON, XGPON, Ethernet PON (EPON), and 10 gigabit EPON (10GEPON) systems, which may be originally designed for TDM/TDM access (TDMA) management. The systems resulting from using these trends and enhancements may have multiple-wavelength capability and use a suitable management mechanism to manage the different wavelengths (or wavelength channels).

Disclosed herein is a system and methods for supporting multiple-wavelength capability in PONs. The system and methods may enable wavelength indication in the multiple-wavelength PON. The methods may comprise mechanisms for downstream wavelength identification and upstream wavelength feedback. The downstream wavelength identification may be used in the case where the PON's ONU receives a single wavelength (or wavelength channel), and thus the ONU may need to know which wavelength the ONU is assigned (by the PON's OLT). Identifying the assigned wavelength to the corresponding ONU may enable the ONU to configure or align its receiver (or filter) to properly receive the associated wavelength channel. The ONU may obtain this information by receiving an identifying protocol element for each assigned downstream wavelength. The wavelength indication may be sent in a MAC layer frame or message. The upstream wavelength feedback may be needed in the case where the OLT needs to associate the upstream transmissions from the ONU with the downstream wavelength which the ONU is receiving. Thus, the OLT may be able to separate or distinguish the downstream and associated upstream wavelength channels for each ONU. By feeding back a wavelength identifier (ID) upstream to the OLT, the OLT may be able to make this association. The methods of wavelength identification may be implemented for GPON, XGPON, EPON, and 10GEPON protocols, for example, or for any other PON protocols that may support wavelength labeling.

FIG. 1 illustrates one embodiment of a PON 100. The PON 100 may comprise an OLT 110, a plurality of ONUs 120, and an ODN 130, which may be coupled to the OLT 110 and the ONUs 120. The PON 100 may be a communications network that does not require any active components to distribute data between the OLT 110 and the ONUs 120. Instead, the PON 100 may use the passive optical components in the ODN 130 to distribute data between the OLT 110 and the ONUs 120. The PON 100 may be NGA systems, such as XGPONs, which may have a downstream bandwidth of about ten Gbps and an upstream bandwidth of at least about 2.5 Gbps. Other examples of suitable PONs 100 include the asynchronous transfer mode PON (APON) and the broadband PON (BPON) defined by the International Telecommunication Union Telecommunication Standardization Sector (ITU-T) G.983 standard, the GPON defined by the ITU-T G.984 standard, the EPON defined by the Institute of Electrical and Electronics Engineers (IEEE) 802.3ah standard, the 10GEPON as described in the IEEE 802.3av standard, and the Wavelength Division Multiplexed WDM-PON. Additionally, the PON 100 may also have multiple-wavelength capability, where multiple downstream and/or upstream wavelengths (or wavelength channels) may be used to carry data, such as for different ONUs 120 or customers. Accordingly, the PON protocol may be configured to support any of the multiple-wavelength technologies described above.

The OLT 110 may be any device that is configured to communicate with the ONUs 120 and another network (not shown). The OLT 110 may act as an intermediary between the other network and the ONUs 120. For instance, the OLT 110 may forward data received from the network to the ONUs 120, and forward data received from the ONUs 120 onto the other network. Although the specific configuration of the OLT 110 may vary depending on the type of PON 100, in an embodiment, the OLT 110 may comprise a transmitter and a receiver. When the other network is using a network protocol, such as Ethernet or Synchronous Optical Networking (SONET)/Synchronous Digital Hierarchy (SDH), that is different from the PON protocol used in the PON 100, the OLT 110 may comprise a converter that converts the network protocol into the PON protocol. The OLT 110 converter may also convert the PON protocol into the network protocol. The OLT 110 may be typically located at a central location, such as a central office, but may be located at other locations as well.

The ONUs 120 may be any devices that are configured to communicate with the OLT 110 and a customer or user (not shown). The ONUs 120 may act as an intermediary between the OLT 110 and the customer. For instance, the ONUs 120 may forward data received from the OLT 110 to the customer, and forward data received from the customer onto the OLT 110. Although the specific configuration of the ONUs 120 may vary depending on the type of PON 100, in an embodiment, the ONUs 120 may comprise an optical transmitter configured to send optical signals to the OLT 110 and an optical receiver configured to receive optical signals from the OLT 110. The transmitters and receivers at different ONUs 120 may use different wavelengths to transmit and receive optical signals that carry data. The transmitter and receiver at the same ONU 120 may use the same wavelength or different wavelengths. Additionally, the ONUs 120 may comprise a converter that converts the optical signal into electrical signals for the customer, such as signals in the Ethernet protocol, and a second transmitter and/or receiver that may send and/or receive the electrical signals to a customer device. In some embodiments, ONUs 120 and optical network terminals (ONTs) are similar, and thus the terms are used interchangeably herein. The ONUs may be typically located at distributed locations, such as the customer premises, but may be located at other locations as well.

The ODN 130 may be a data distribution system, which may comprise optical fiber cables, couplers, splitters, distributors, and/or other equipment. The optical fiber cables, couplers, splitters, distributors, and/or other equipment may be passive optical components that may not require any power to distribute data signals between the OLT 110 and the ONUs 120. Alternatively, the ODN 130 may comprise one or a plurality of processing equipment, such as optical amplifiers. The ODN 130 may typically extend from the OLT 110 to the ONUs 120 in a branching configuration as shown in FIG. 1, but may be alternatively configured in any other point-to-multi-point configuration.

To support multiple-wavelength capability, the PON 100 may comprise one or more AWGs, such as at the ODN 130 and/or the OLT 110. The AWGs may be configured to combine/split multiple wavelength channels, which may be optical signals transmitted at different wavelengths, in the upstream/downstream directions. The PON 100 may also be configured to implement one or more methods for wavelength identification to indicate to the ONUs 120 and/or the OLT 110 which wavelengths (or wavelength channels) are assigned to the corresponding ONUs 120. The wavelength identification methods may be used to indicate the wavelengths to the ONUs 120, to the OLT 110, or both. The wavelength identification methods may be used to identify the wavelengths for downstream data channels (form the OLT 110 to the ONUs 120), upstream data channels (from the ONUs 120 to the OLT 110), or both. The wavelength identification methods may comprise downstream wavelength identification mechanisms and upstream wavelength feedback mechanisms as described below.

Downstream wavelength identification may be used to identify the wavelengths for downstream transmission to the ONUs. Downstream wavelength identification may be established using different mechanisms or implementations, which may be used to send a downstream wavelength identification (e.g., from the OLT 110 to a corresponding ONU 120). The different mechanisms may use MAC layer frames or messages to carry the wavelength identification. A first mechanism for downstream wavelength identification may use an embedded channel. The embedded channel mechanism or approach may use in-band frame fields and embedded structures to carry low-level operations, administration, and management (OAM) information. The embedded channel may typically offer a low-latency path for fast actions and enable basic functions for MAC devises. Examples of the embedded channels include the embedded OAM in GPON and XGPON protocols, and the logical link identifier (LLID) in EPON and 10GEPON protocols.

A second mechanism for downstream wavelength identification may use a control message channel. The control message channel may employ protocol management messages to facilitate the connections between the OLT and the ONUs. Examples of the control message channel include a physical layer OAM (PLOAM) message in GPON and XGPON protocols, and a multi-point control protocol (MPCP) message in EPON and 10GEPON protocols. A third mechanism for downstream wavelength identification may use a data channel. Specifically, the wavelength information may be carried in the PON data channel to the ONUs. In GPON and XGPON protocols, GPON encapsulation method (GEM) or 10 GEM (XGEM) ports may be configured by an ONT management and control interface (OMCI) for this purpose. In EPON and 10GEPON protocols, the LLIDs may be designed towards this end.

Figure 2:
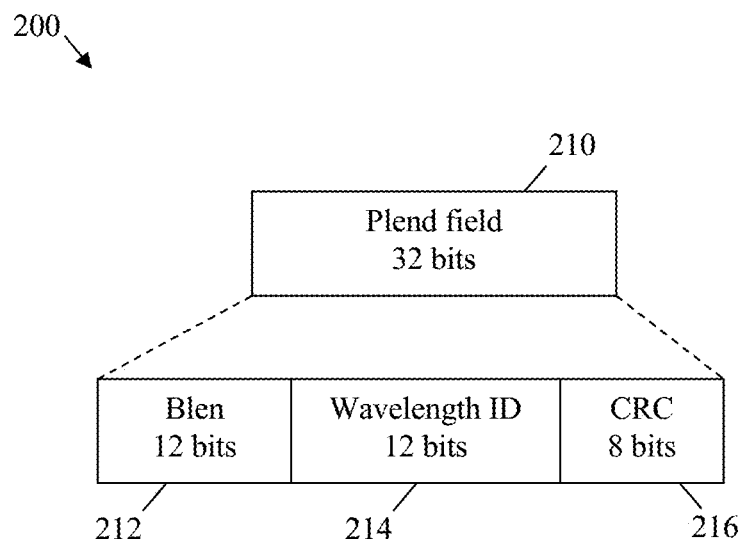
FIG. 2 is a schematic diagram of an embodiment of an embedded channel for downstream wavelength identification.

FIG. 2 illustrates an embodiment of a portion of a frame or message 200 corresponding to an embedded channel that may be used for downstream wavelength identification. The embedded channel may be an embedded OAM channel for the GPON protocol and may use a portion of a GPON downstream frame. The GPON embedded OAM channel information may be sent from the OLT to a corresponding ONU for downstream wavelength identification. The OLT may use the GPON downstream frame to indicate to the ONU the assigned wavelength for downstream transmissions. The downstream wavelength identification may be sent in a GPON downstream frame that comprises a Payload Length downstream (Plend) field 210. The Plend field 210 may include a B length (Blen) subfield 212, an A length (Alen) subfield 214, and a cyclic redundancy check (CRC) subfield 216. The Plend field 210 may have a total size of about 32 bits. The Blen subfield 212 may indicate the length (in bytes) of another field (not shown) in the message or frame. The Blen subfield 212 may have a size of about 12 bits. The Alen subfield 214 may indicate the downstream wavelength. The Alen subfield 214 may have a size of about 12 bits. The CRC subfield 216 may have a size of about 8 bits and may be configured as defined in the GPON protocol.

Figure 3:
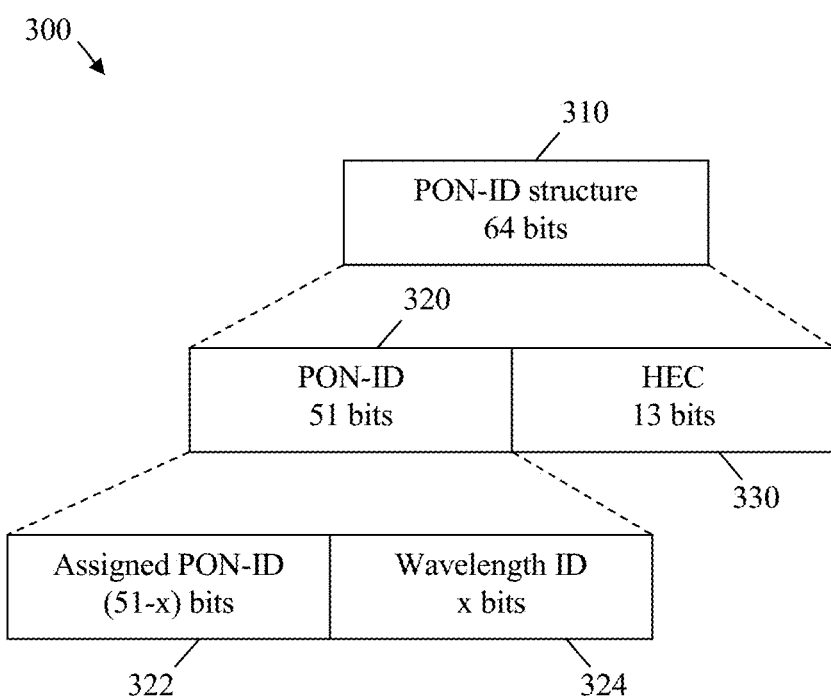
FIG. 3 is a schematic diagram of another embodiment of an embedded channel for downstream wavelength identification.

FIG. 3 illustrates an embodiment of another frame or message portion 300 corresponding to an embedded channel 300 that may be used for downstream wavelength identification. The embedded channel may be an embedded OAM channel for the XGPON protocol and may use a portion of an XGPON downstream Physical layer (PHY) frame. The XGPON downstream PHY frame may comprise a 24-byte physical synchronization block (PSBd) and a 155496-byte PHY frame payload. The PSBd may comprise a PON-ID structure 310, which may be used to indicate the downstream wavelength (from the OLT to the corresponding ONU). The PON-ID structure 310 may have a size of about 64 bits. The PON-ID structure 310 may comprise a PON-ID field 320 and a header error control (HEC) field 330. The PON-ID field 320 may comprise an assigned PON-ID subfield 322 and a wavelength ID subfield 324. The PON-ID subfield 322 may indicate a PON ID for a corresponding ONU and the wavelength ID subfield 324 may indicate the downstream wavelength for the ONU. The PON-ID field 320 may have a size of about 51 bits, the assigned PON-ID subfield 322 may have a size of about 51-x bits, where x is an integer, and the wavelength ID subfield 324 may have a size of about x bits. The HEC field 330 may have a size of about 13 bits and may be configured as defined in the XGPON protocol. The integer x may be determined based on the number of downstream wavelengths in the multiple-wavelength PON system. Typical values of x may be equal to 4, 5, or 6 to represent 16, 32, or 64 total downstream wavelengths, respectively. The actual order of the assigned PON-ID subfield 322 and the wavelength ID subfield 324 may be similar or different than the order shown in FIG. 3.

Since the GPON and XGPON downstream frames may be broadcasted from the OLT to a plurality of or all the ONUs, e.g., with a lifetime or duration of about 125 microsecond (s), the wavelength ID may be announced to the ONUs for the same downstream wavelength periodically. The ONUs may be configured to confirm the downstream wavelength by comparing the wavelength ID and the corresponding ONUs' receiver wavelengths.

Figures 4, 5:
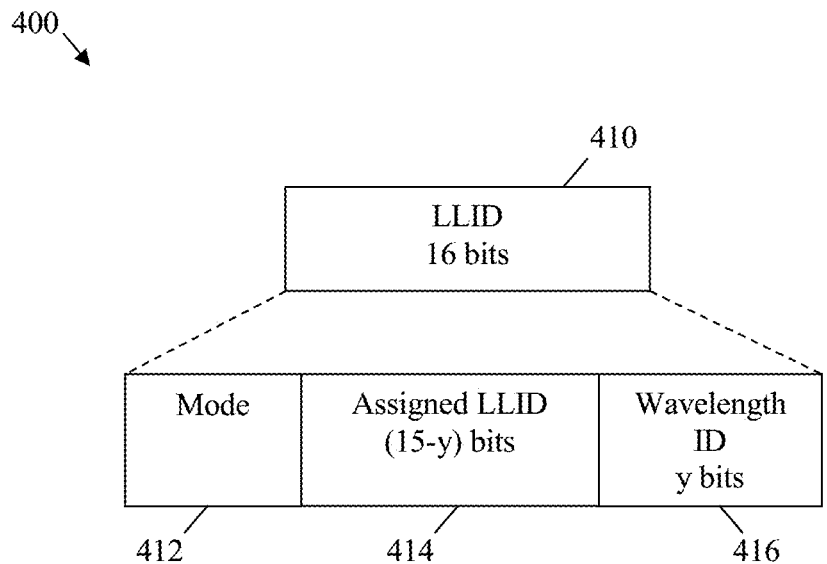
FIG. 4 is a schematic diagram of another embodiment of an embedded channel for downstream wavelength identification.
FIG. 5 is a schematic diagram of an embodiment of a control message channel for downstream wavelength identification.

FIG. 4 illustrates an embodiment of another embedded channel 400 for downstream wavelength identification. The embedded channel 400 may be an embedded LLID channel for EPON or 10GEPON protocols and may use a portion of an EPON downstream frame. In EPON and 10GEPON, the LLID may be assigned to a point-to-multi-point (P2MP) association between an OLT and multiple ONUs, where each ONU association may be established through a point-to-point (P2P) emulation. The EPON downstream frame may comprise an LLID field 410. The LLID field 410 may comprise a mode subfield 412, an assigned LLID subfield 414, and a wavelength ID subfield 416. The LLID field 410 may have a size of about 16 bits. The mode subfield 412 may be a one bit flag that is set to indicate the assigned LLID. The mode subfield 412 may correspond to the most significant bit (MSB) in the LLID field 410. The assigned LLID subfield 414 may indicate the LLID assigned for a corresponding ONU. The assigned LLID subfield 414 may have a size of about 15-y bits, where y is an integer. The wavelength ID subfield 416 may indicate the downstream wavelength for the ONU. The wavelength ID subfield 416 may have a size of about y bits. The actual order of the wavelength ID subfield 416 may be similar or different than the order shown in FIG. 4.

In the control message channel mechanism or approach for downstream wavelength identification, a PLOAM channel message may be used in GPON and XGPON protocols. The downstream wavelength identification may be implemented using a new PLOAM message or a modified PLOAM message, as described below. FIG. 5 illustrates an embodiment of a control message channel 500 for downstream wavelength identification. The control message channel 500 may use a modified upstream overhead PLOAM message for the GPON protocol. The modified upstream overhead PLOAM message may comprise about 12 fields, which may each have a size of about one octet. The fields of the upstream overhead PLOAM message shown in FIG. 5 may be configured as defined in the GPON protocol. However, some of the fields or bits may be modified to enable downstream wavelength identification. Specifically, the bits in octets 3 to 5 may not be fully used to represent the bit numbers in the corresponding fields (guard bit number, type 1 preamble bit number, and type 2 preamble bit number). Such bits in the corresponding octets (or fields) may be used for downstream wavelength identification. Additionally, some of the bits in octet 10 (for various indication) may also be used for downstream wavelength identification. The octets that may be at least partially used for this purpose are shaded in FIG. 5.

FIG. 6 illustrates an embodiment of another control message channel 600 for downstream wavelength identification. The control message channel 600 may use a modified upstream profile PLOAM message for the XGPON protocol. The modified profile PLOAM message may comprise about 13 fields, which may have a total size of about 48 octets. The fields and corresponding sizes shown in FIG. 6 may be configured as defined in the XGPON protocol. However, some of the fields are modified to enable downstream wavelength identification. Specifically, the bits in octets 5 to 7, 16 to 17, and 34 to 40 may not be fully used in the corresponding fields. At least some of the bits in octets 5 to 7 (for profile version and index, forward error correction (FEC) indication, and delimiter length), some of the bits in octets 16 to 17 (for preamble length and preamble repeat count), and/or some of the bits in octets 34 to 40 (for padding) may be used for downstream wavelength identification. The octets that may be at least partially used for this purpose are shaded in FIG. 6.

FIG. 7 illustrates an embodiment of another control message channel 700 for downstream wavelength identification. The control message channel 700 may be a new PLOAM message for the XGPON and GPON protocols. The new PLOAM message may comprise about 6 fields, which may have a total size of about 48 octets. The fields and corresponding sizes are shown in FIG. 7. Specifically, a downstream wavelength field may be used to indicate the downstream wavelength. The downstream wavelength field may use octet 5 to "a", where "a" is an integer.

FIG. 8 illustrates an embodiment of another control message channel 800 for downstream wavelength identification. The control message channel 800 may use a modified gate MPCP data unit (MPCPDU) for the EPON and 10GEPON protocols. The MPCPDUs are Ethernet frames that carry multi-point MAC control information. The modified gate MPCPDU may comprise about 8 fields, which may have a total size of about 64 octets. The fields and corresponding sizes shown in FIG. 8 may be configured as defined in the EPON and 10GEPON protocols. However, some of the fields are modified to enable downstream wavelength identification. Specifically, the bits in octets 22 to 60 may not be fully used (for grant and pad). Some of the bits in octets 22 to 66 may be used for downstream wavelength identification. The octets that may be at least partially used for this purpose are shaded in FIG. 8.

FIG. 9 illustrates an embodiment of another control message channel 900 for downstream wavelength identification. The control message channel 900 may be a new MPCPDU for the EPON and 10GEPON. The new MPCPDU may comprise about 8 fields, which may have a total size of about 64 octets. The fields and corresponding sizes are shown in FIG. 9. Specifically, a downstream wavelength field may be used to indicate the downstream wavelength. The downstream wavelength field may use octets 21 to "b" octets, where "b" is an integer.

In the data channel mechanism or approach for downstream wavelength identification, a user data channel (data message) may be configured to deliver the downstream wavelength information in the GPON and XGPON protocols. Similar to providing multicast services, an OMCI may be used to configure GEM or XGEM ports to send this information. In the EPON and 10GEPON protocols, a broadcast LLID may be defined for this purpose. The frames that comprise the broadcast LLID may also include content for downstream wavelength identification.

Figure 10:
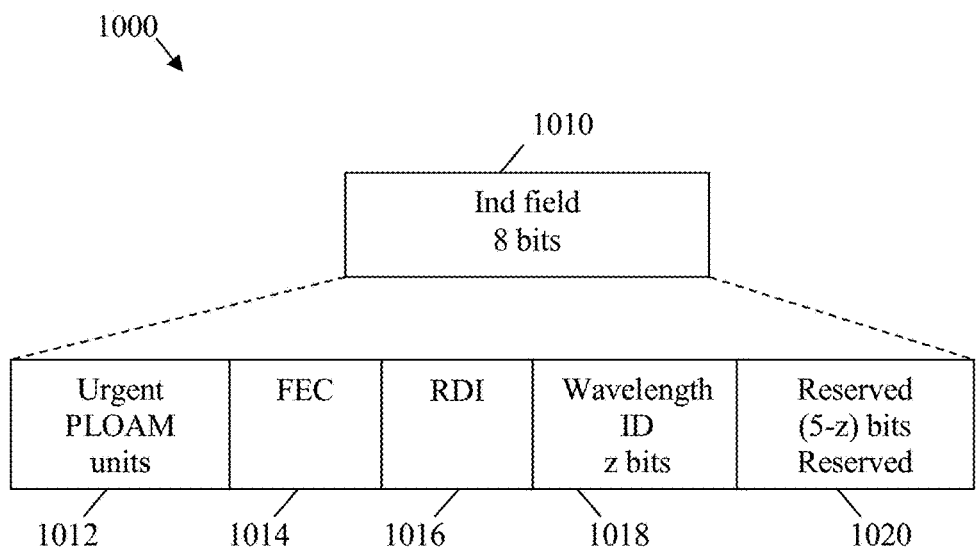
FIG. 10 is a schematic diagram of an embodiment of an embedded channel for upstream wavelength feedback.

FIG. 10 illustrates an embodiment of an embedded channel 1000 for upstream wavelength feedback. The embedded channel 1000 may be an embedded OAM channel for the GPON protocol and may use a GPON upstream burst header. This GPON embedded OAM channel information may be sent from the ONU to the OLT for upstream wavelength feedback. The ONU may use the GPON upstream burst header to indicate to the OLT the wavelength for upstream transmissions or for the ONU's receiver. The upstream wavelength feedback may be sent in a GPON upstream burst header that comprises an indication (Ind) field 1010. The Ind field 1010 may include an urgent PLOAM units subfield 1012, a FEC subfield 1014, a remote defect indication (RDI) subfield 1016, a wavelength ID subfield 1018, and a reserved subfield 1020. The subfields may be configured as defined in the GPON protocol, where the MSB reports urgent PLOAM and the following two bits report FEC and RDI status respectively. However, about z bits from the 5 currently reserved bits may be used to indicate the upstream wavelength, where z is an integer. The remaining 5-z bits may remain reserved. The actual order of the wavelength ID subfield 1018 may be similar or different than the order shown in FIG. 10. Using the wavelength ID in the GPON upstream burst header, the OLT may be able to confirm or check the wavelength of an ONU in the protocol layer.

Figure 11:
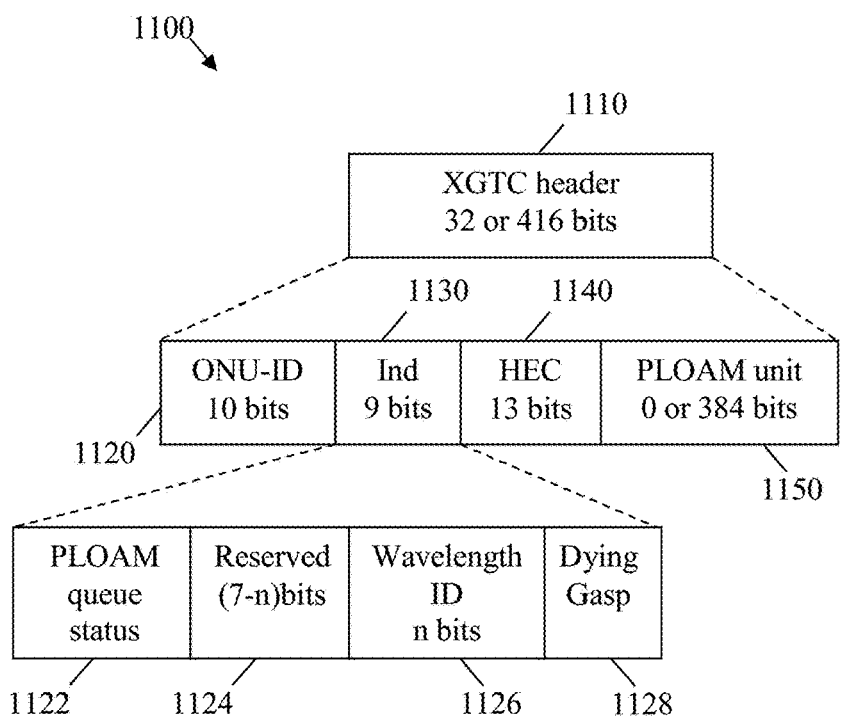
FIG. 11 is a schematic diagram of another embodiment of an embedded channel for upstream wavelength feedback.

FIG. 11 illustrates an embodiment of another embedded channel 1100 for upstream wavelength feedback. The embedded channel 1100 may be an embedded OAM channel for the XGPON protocol and may use a XGPON Transmission Container (XGTC) burst header. The XGPON embedded OAM channel information may be sent from the ONU to the OLT for upstream wavelength feedback. The ONU may use the XGTC burst header to indicate to the OLT the wavelength for upstream transmissions. The upstream wavelength feedback may be sent in a XGTC burst header 1110 that comprises an ONU-ID field 1120, and Ind field 1130, a HEC field 1140, and a PLOAM unit field 1150, which may be configured as defined in the XGPON protocol. The ONU-ID field 1120 may have a size of about 10 bits. The Ind field 1130 may have a size of about 9 bits. The HEC field 1140 may have a size of about 13 bits. The PLOAM unit field 1150 may be optional and may have a size up to about 384 bits. The ONU-ID field 1120 may comprise a PLOAM queue status subfield 1122 that may be the MSB (a one bit flag), a reserved subfield 1124, a wavelength ID subfield 1126, and a dying gasp subfield 1128 that may be the least significant bit (LSB). About n bits from the 7 currently reserved bits may be used to indicate the upstream wavelength, where n is an integer. The remaining 7-n bits may remain reserved. The integer n may be determined based on the number of wavelengths in the multiple-wavelength PON system. Typical values of n may be are 4, 5, or 6 to represent 16, 32, or 64 total wavelengths respectively. The actual order of the wavelength ID subfield 1126 may be similar or different than the order shown in FIG. 10.

In another embodiment, upstream wavelength feedback may be achieved by defining different delimiters for different downstream wavelengths. Thus, multiple ONUs that share the same downstream wavelength may use the same type of delimiter. For example, delimiter type 1 may be for downstream wavelength 1 and delimiter type 2 may be for downstream wavelength 2. As such, the upstream burst delimiter may indicate to the OLT the working downstream wavelength of the corresponding ONU. In some embodiments for EPONs and 10GEPONs, a 2-byte LLID may be modified as shown in FIG. 4 to support upstream wavelength feedback. Accordingly, some bits may be assigned to carry the feedback. After receiving this information, the OLT may be able to correlate the downstream and upstream wavelengths for an ONU.

FIG. 12 illustrates an embodiment of a control message channel 1200 for upstream wavelength feedback. The control message channel 1200 may be a new PLOAM message for the XGPON and GPON protocols. The new PLOAM message may comprise about 6 fields, which may have a total size of about 48 octets. The fields and corresponding sizes are shown in FIG. 12. Specifically, a wavelength field may be used to indicate the upstream wavelength feedback. The wavelength field may use octet 5 to "a", where "a" is an integer.

Similar to the control message channels 500 and 600 for downstream wavelength identification that use modified PLOAM messages for GPON and XGPON respectively, control message channels that use modified PLOAM messages may also be used for upstream wavelength feedback for the GPON and XGPON protocols. For example, in the GPON protocol, an acknowledge PLOAM message or a No PLOAM message may be modified. A Serial_Number_ONU field in the PLOAM message may be modified to carry the upstream wavelength feedback. Similarly, in the XGPON protocol, an acknowledge PLOAM message and a Serial_Number_ONU PLOAM field in the message may be modified to carry the wavelength feedback.

FIG. 13 illustrates an embodiment of another control message channel 1300 for upstream wavelength feedback. The control message channel 1300 may use a modified report MPCPDU for the EPON and 10GEPON protocols. The modified report MPCPDU may comprise about 8 fields, which may have a total size of about 64 octets. The fields and corresponding sizes shown in FIG. 13 may be configured as defined in the EPON and 10GEPON protocols. However, some of the fields are modified to enable upstream wavelength feedback. Specifically, the bits in octets 23 to 60 may not be fully used (for report and pad). Some of the bits in octets 23 to 60 may be used for upstream wavelength feedback. The octets that may be at least partially used for this purpose are shaded in FIG. 13.

FIG. 14 illustrates an embodiment of another control message channel 1400 for upstream wavelength feedback. The control message channel 1400 may be a new MPCPDU for the EPON and 10GEPON. The new MPCPDU may comprise about 8 fields, which may have a total size of about 64 octets. The fields and corresponding sizes are shown in FIG. 14. Specifically, a wavelength field may be used to indicate the wavelength feedback. The wavelength field may use octets 21 to "b" octets, where "b" is an integer.

In the data channel approach for upstream wavelength feedback, a user data channel (data message) may be configured to deliver the wavelength feedback in the GPON and XGPON protocols. GEM or XGEM ports may be configured by OMCI for this purpose. In the EPON and 10GEPON protocols, a dedicated or special LLID may be defined for this purpose. The frames that comprise the dedicated LLID may also include content for wavelength feedback.

In other embodiments, the upstream wavelength feedback may indicate the actual wavelength being used for the upstream transmission (instead of the wavelength or channel ID). The OLT equipment may typically know this information based on which receiver channel the transmission arrives on from the ONUs. However, the actual wavelength information from the ONUs may be used as a double check. The wavelength information exchanged between the OLT and its associated ONUs may be absolute values, relative values, or identification values (e.g., IDs). The relative value may be relevant to a previous exchanged value or a predetermined absolute benchmark value. In order to support identification values, a certain mechanism of wavelength profiling may be used. Different schemes may be used to define the specific mapping between wavelengths and their IDs. For example, some PLOAM messages (e.g., profile PLAOM message) may be extended to carry such information. Alternatively, new control messages may be defined for this purpose.

Figure 15:
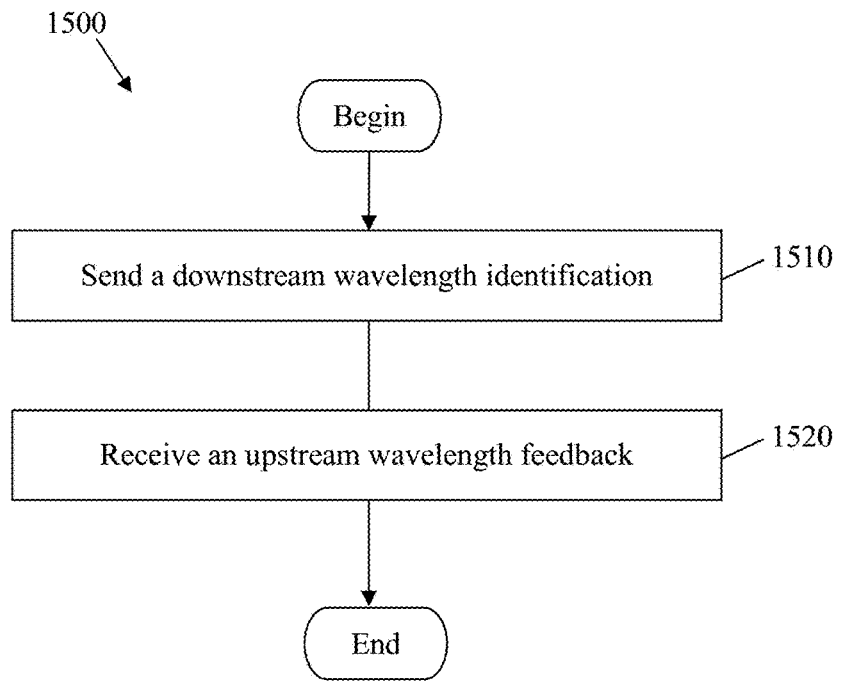
FIG. 15 is a flowchart of an embodiment of a wavelength identification/feedback method.

FIG. 15 illustrates an embodiment of a wavelength identification/feedback method 1500, which may be implemented in a multiple-wavelength PON system to exchange wavelength information between an OLT and a corresponding ONU. The method 1500 may begin at block 1510, where a downstream wavelength identification may be sent. The OLT may send the downstream wavelength identification to the corresponding ONU using any of the mechanisms or approaches and the appropriate corresponding messages for downstream wavelength identification described above, e.g., based on the PON protocol. The approaches include the embedded channels 200, 300, and 400, the control message channels 500, 600, 700, 800, and the data channels for downstream wavelength identification. As such, the OLT may identify the wavelength for the corresponding ONU. The wavelength identified may be the wavelength used to send data to that ONU. At block 1520, an upstream wavelength feedback may be received. The OLT may receive the upstream wavelength feedback from the corresponding ONU using an approach, channel, or message similar or corresponding to the one used for sending the downstream wavelength identification, e.g., based on the same PON protocol. The approaches include the embedded channels 1000 and 11000, the control message channels 1200, 1300, and 1400, and the data channels for upstream wavelength feedback. As such, the ONU may confirm or inform the OLT of the actual wavelength that is used at the ONU to receive data. The method 1500 may then end.

The method 1500 may be used to confirm the wavelengths used by the ONUs, to inform the OLT of the wavelengths used by the ONUs, to change the wavelengths used by the ONUs, or to correct or synchronize the wavelength usage information. In other embodiments, the block 1510 or 1520 may be implemented separately and independently without implementing the other block to convey the wavelength information in the downstream or upstream direction. Although the method 1500 is described in terms of the wavelengths used at the ONUs' receivers. A similar method may be used for the wavelengths used at the ONUs' transmitters or both at the ONUs' receivers and transmitters.

Figure 16:
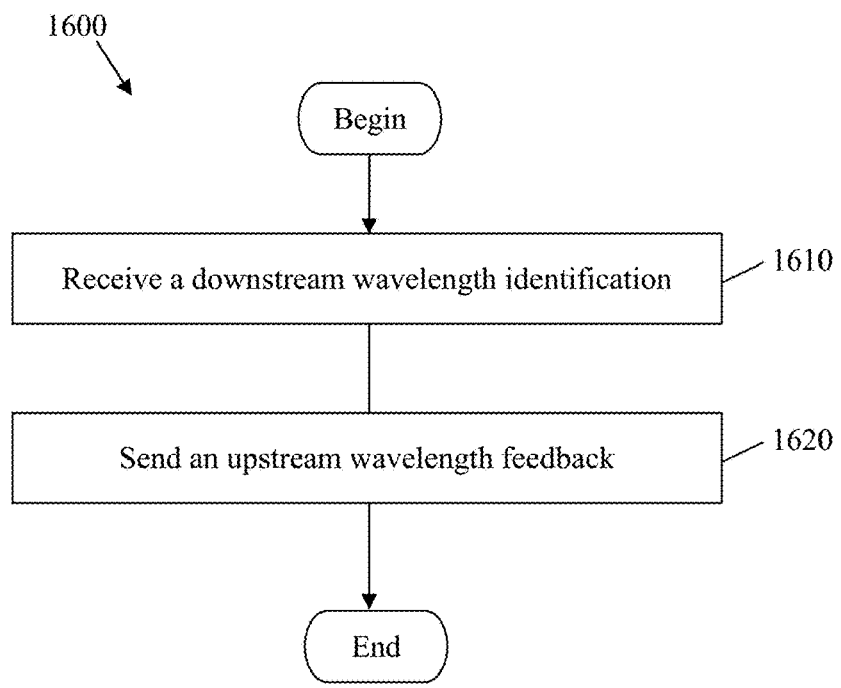
FIG. 16 is a flowchart of another embodiment of a wavelength identification/feedback method.

FIG. 16 illustrates another embodiment of a wavelength identification/feedback method 1600, which may be implemented in a multiple-wavelength PON system to exchange wavelength information between an ONU and an OLT. The method 1600 may begin at block 1610, where a downstream wavelength identification may be received. The ONU may receive the downstream wavelength identification from the OLT using any of the approaches and the appropriate corresponding messages for downstream wavelength identification described above, e.g., based on the PON protocol. The wavelength identified may be the wavelength used by the OLT to send data to the ONU. At block 1620, an upstream wavelength feedback may be sent. The ONU may send the upstream wavelength feedback to the OLT using a corresponding approach, channel, or message to the one used for sending the downstream wavelength identification, e.g., based on the same PON protocol. As such, the ONU may confirm or inform the OLT of the actual wavelength that is used at the ONU to receive data. The method 1600 may then end.

The method 1600 may be used to confirm the wavelengths used by the ONUs, to inform the OLT of the wavelengths used by the ONUs, to change the wavelengths used by the ONUs, or to correct or synchronize the wavelength usage information. In other embodiments, the block 1610 or 1620 may be implemented separately and independently without implementing the other block to convey the wavelength information in the downstream or upstream direction. The method 1600 may be used for identifying/acknowledging the wavelengths used at the ONUs' receivers, at the ONUs' transmitters, or both.

Figure 17:
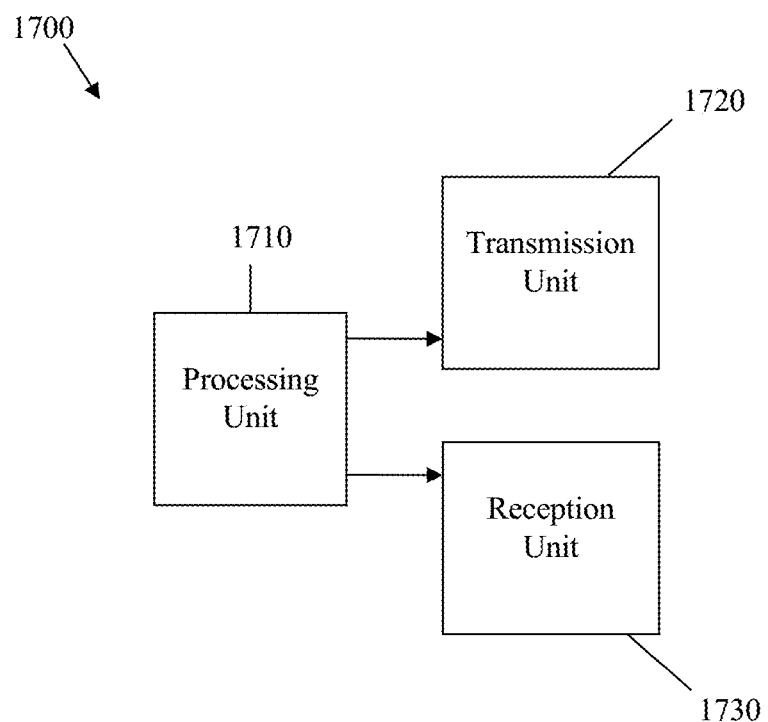
FIG. 17 is a schematic diagram of an embodiment of an apparatus configured to implement a PON wavelength identification/feedback method.

FIG. 17 illustrates an embodiment of an apparatus 1700 that may be configured to support and implement the wavelength identification/feedback method 1500 or 1600. The apparatus 1700 may comprise a processing unit 1710, a transmission unit (or transmitter) 1720, and a reception unit (or receiver) 1730 that may be configured to implement the method 1500 or 1600. For example, the apparatus 1700 may be located at an OLT and may implement the method 1500. Alternatively, the apparatus 1700 may be located at an ONU and may be configured to implement the method 1600. The processing unit 1710, the transmission unit 1720, and the reception unit 1730 may correspond to hardware, firmware, and/or software installed to run hardware. The processing unit 1710 may be configured to put or get the wavelength ID (or value) for downstream wavelength identification or upstream wavelength feedback in a MAC layer based frame or message, e.g., that corresponds to an embedded channel, a control message channel, or a data channel. The processing unit 1710 may send or receive the MAC layer based message or frame comprising the wavelength identification/feedback to the transmission unit 1720 or from the reception unit 1730, respectively. The transmission unit or transmitter 1720 may be configured to transmit the message or frame (at the MAC layer), and the reception unit or receiver 1730 may be configured to receive the message or frame. At the OLT, the transmission unit 1720 may send a frame for downstream wavelength identification and the reception unit 1730 may receive a frame for upstream wavelength feedback. At the ONU, the reception unit 1730 may receive a frame for downstream wavelength identifications and the transmission unit 1720 may send a frame for upstream wavelength feedback.

Figure 18:
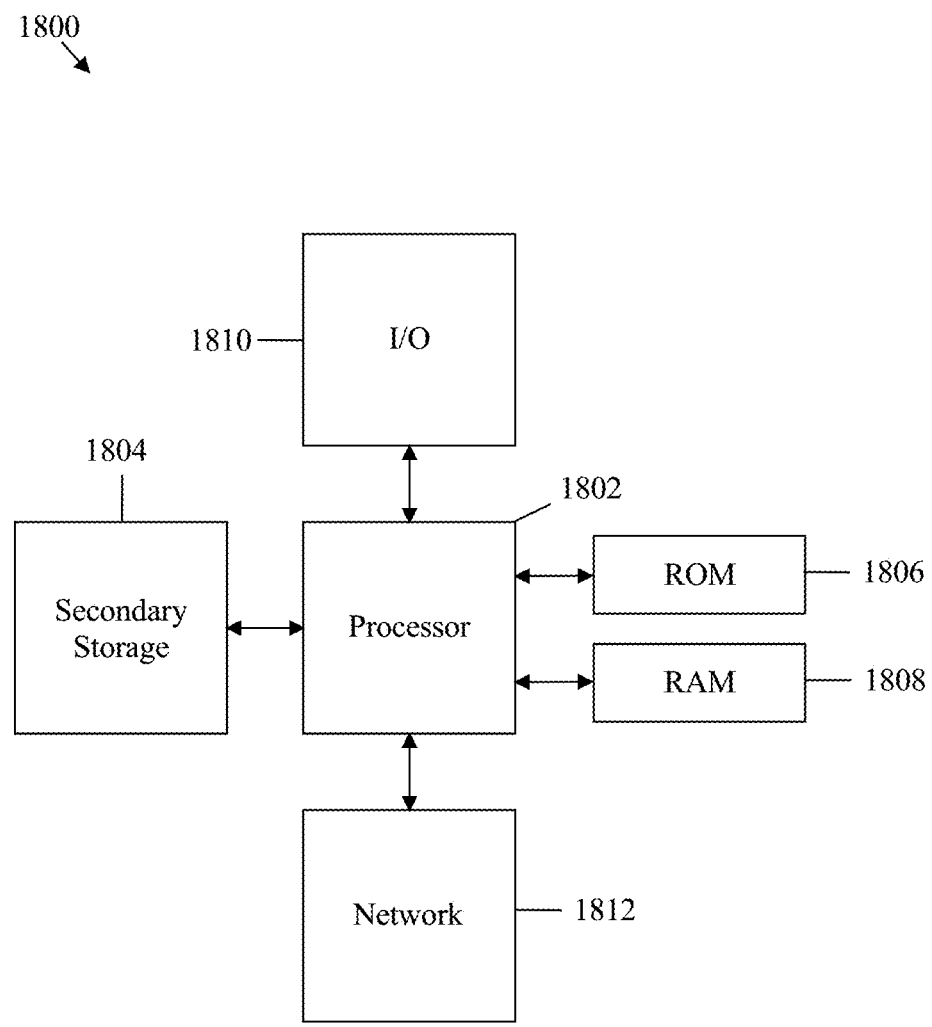
FIG. 18 is a schematic diagram of an embodiment of a general-purpose computer system.

The components, methods, and mechanisms described above may be implemented on any general-purpose network component (at the OLT or ONU), such as a computer or network component with sufficient processing power, memory resources, and network throughput capability to handle the necessary workload placed upon it. FIG. 18 illustrates a typical, general-purpose network component 1800 suitable for implementing one or more embodiments of the components, methods, and mechanisms disclosed herein. The network component 1800 includes a processor 1802 (which may be referred to as a central processor unit or CPU) that is in communication with memory devices including secondary storage 1804, read only memory (ROM) 1806, random access memory (RAM) 1808, input/output (I/O) devices 1810, and network connectivity devices 1812. The processor 1802 may be implemented as one or more CPU chips, or may be part of one or more application specific integrated circuits (ASICs).

The secondary storage 1804 is typically comprised of one or more disk drives or tape drives and is used for non-volatile storage of data and as an over-flow data storage device if RAM 1808 is not large enough to hold all working data. Secondary storage 1804 may be used to store programs that are loaded into RAM 1808 when such programs are selected for execution. The ROM 1806 is used to store instructions and perhaps data that are read during program execution. ROM 1806 is a non-volatile memory device that typically has a small memory capacity relative to the larger memory capacity of secondary storage 1804. The RAM 1808 is used to store volatile data and perhaps to store instructions. Access to both ROM 1806 and RAM 1808 is typically faster than to secondary storage 1804.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 7 percent, . . . , 70 percent, 71 percent, 72 percent, . . . , 97 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented at an optical network unit (ONU) for communications in a passive optical network (PON) system that supports a plurality of downstream wavelengths, comprising:
   receiving, by the ONU, a PON downstream Physical Layer (PHY) frame comprising a downstream physical synchronization block (PSBd) and a PHY frame payload, wherein the PSBd comprises a wavelength identification (ID) of a downstream wavelength of the plurality of downstream wavelengths;
   processing, by the ONU, the PON PHY frame to receive data sent to the ONU.

2. The method of claim 1, further comprising: receiving, by the ONU, a physical layer operations, administration, and management (PLOAM) message comprising one or more wavelength IDs that indicate one or more upstream or downstream wavelengths.

3. The method of claim 1, wherein the PSBd comprises a PON identifier field, and wherein the wavelength ID is a part of the PON identifier field of the PSBd.

4. The method of claim 3, wherein the wavelength ID is carried in a 4-bits subfield of the PON identifier field of the PSBd.

5. The method of claim 1, further comprising: correcting, by the ONU, wavelength use information in response to the receipt of the PON downstream PHY frame comprising the wavelength ID in the PSBd.

6. An optical network unit (ONU) for communications in a passive optical network (PON) system that supports a plurality of downstream wavelengths, comprising:
   a receiver that receives a PON downstream Physical Layer (PHY) frame comprising a downstream physical synchronization block (PSBd) and a PHY frame payload, wherein the PSBd comprises a wavelength identification (ID) of a downstream wavelength of the plurality of downstream wavelengths;
   a processor that is communicatively coupled to the receiver and process the PON PHY frame to receive data sent to the ONU.

7. The ONU of claim 6, wherein the receiver is further configured to receive a physical layer operations, administration, and management (PLOAM) message comprising one or more wavelength IDs that indicate one or more upstream or downstream wavelengths.

8. The ONU of claim 6, wherein the PSBd comprises a PON identifier field, and wherein the wavelength ID is a part of the PON identifier field of the PSBd.

9. The ONU of claim 8, wherein the wavelength ID is carried in a 4-bits subfield of the PON identifier field of the PSBd.

10. The ONU of claim 6, wherein the processor is further configured to correct wavelength use information in response to the receipt of the PON downstream PHY frame comprising the wavelength ID in the PSBd.

11. A method implemented at an optical line terminal (OLT) for communications in a passive optical network (PON) system that supports a plurality of downstream wavelengths, comprising:
    generating, by the OLT, a PON downstream Physical Layer (PHY) frame comprising a downstream physical synchronization block (PSBd) and a PHY frame payload, wherein the PSBd comprises a wavelength identification (ID) of a downstream wavelength of the plurality of downstream wavelengths;

sending, by the OLT, the PON downstream PHY frame comprising the wavelength ID in the PSBd to one or more optical network units (ONUs) communicatively coupled to the OLT.

12. The method of claim 11, wherein the PSBd comprises a PON identifier field, and wherein the wavelength ID is a part of the PON identifier field of the PSBd.

13. The method of claim 12, wherein the wavelength ID is carried in a 4-bits subfield of the PON identifier field of the PSBd.

14. The method of claim 11, further comprising: transmitting, by the OLT, a physical layer operations, administration, and management (PLOAM) message comprising one or more wavelength IDs that indicate one or more upstream or downstream wavelengths.

15. An optical line terminal (OLT) apparatus for communications in a passive optical network (PON) system that supports a plurality of downstream wavelengths, comprising:

a processor that generates a PON downstream Physical Layer (PHY) frame comprising a downstream physical synchronization block (PSBd) and a PHY frame payload, wherein the PSBd comprises a wavelength identification (ID) of a downstream wavelength of the plurality of downstream wavelengths;

a transmitter that is communicatively coupled to the processor and sends the PON downstream PHY frame comprising the wavelength ID in the PSBd to one or more optical network units (ONUs) communicatively coupled to the OLT apparatus.

16. The OLT of claim 15, wherein the PSBd comprises a PON identifier field, and wherein the wavelength ID is a part of the PON identifier field of the PSBd.

17. The OLT of claim 16, wherein the wavelength ID is carried in a 4-bits subfield of the PON identifier field of the PSBd.

18. The OLT of claim 15, wherein the transmitter is further configured to transmit a physical layer operations, administration, and management (PLOAM) message comprising one or more wavelength IDs that indicate one or more upstream or downstream wavelengths.

19. The method of claim 1, further comprising: confirming, by the ONU, the downstream wavelength in accordance with the wavelength ID in the PSBd.

20. The ONU of claim 6, wherein the processor is further configured to confirm the downstream wavelength in accordance with the wavelength ID in the PSBd.

* * * * *